Jan. 1, 1935.  H. HARRISON  1,986,432
EASEL
Filed Sept. 28, 1933   3 Sheets-Sheet 1

INVENTOR
Henry Harrison,
BY J. Stuart Freeman
ATTORNEY

Jan. 1, 1935.  H. HARRISON  1,986,432
EASEL
Filed Sept. 28, 1933  3 Sheets-Sheet 2

INVENTOR
Henry Harrison,

BY
J. Stuart Freeman.
ATTORNEY

Jan. 1, 1935. H. HARRISON 1,986,432
EASEL
Filed Sept. 28, 1933   3 Sheets-Sheet 3
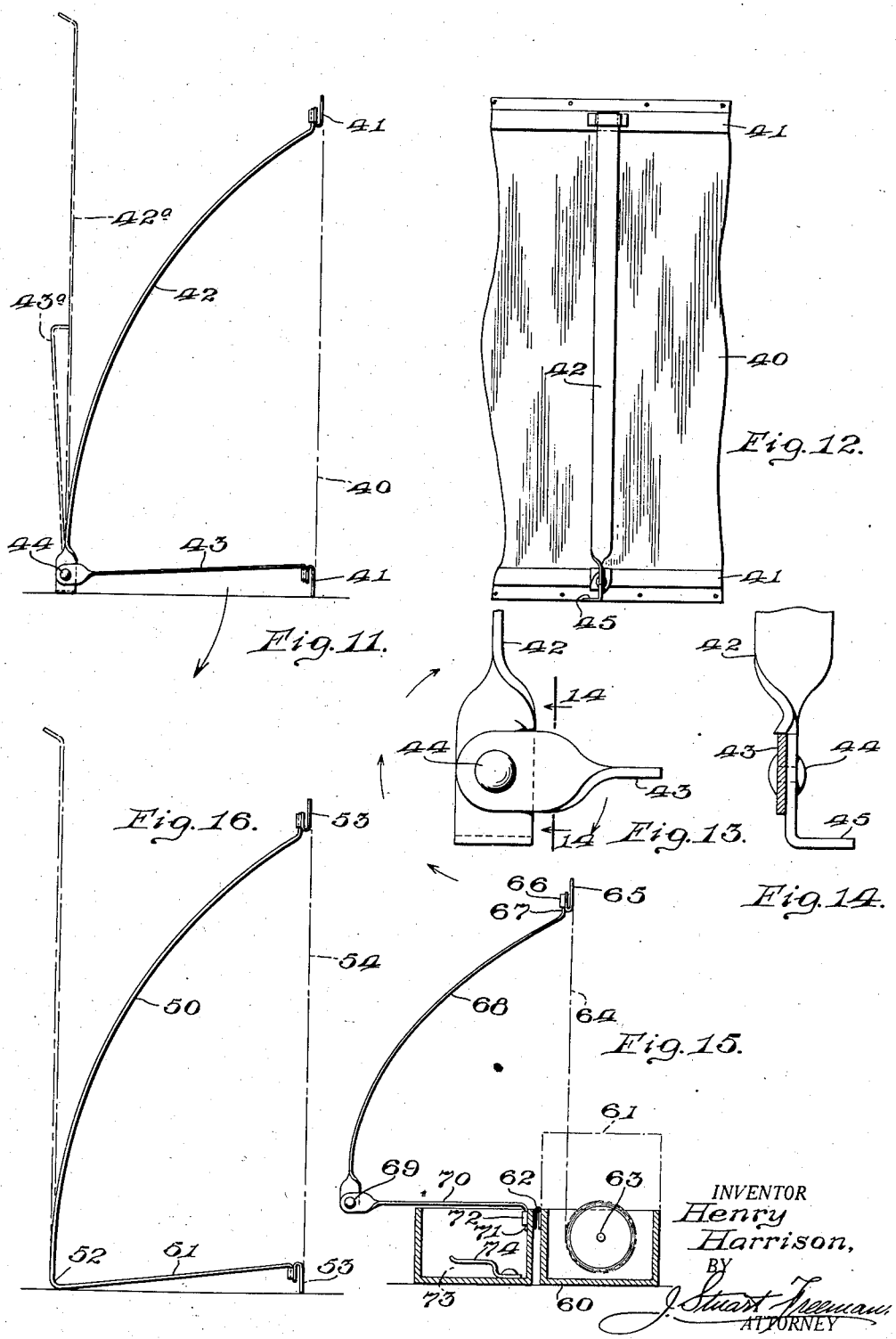
INVENTOR
Henry Harrison,
BY
J. Stuart Freeman
ATTORNEY Patented Jan. 1, 1935

1,986,432

UNITED STATES PATENT OFFICE 1,986,432

EASEL

Henry Harrison, Conshohocken, Pa.

Application September 28, 1933, Serial No. 691,341

3 Claims. (Cl. 40—125)

The object of the invention broadly is to provide improvements in easels, usually of collapsible structure, and inspired by the needs of certain forms of display advertising, tho they are equally adaptable to various other uses, such for instance as comprising supports for motion picture projection screens, and similar uses.

Another object of the invention is to provide an improved collapsible easel, which can be inserted within pneumatic tire casings, so that the supporting portions of the device are substantially entirely hidden from view, while the display matter may span the entire circular opening of the central portion of the casing when viewed broadside.

A further object is to provide a modified form of such easel, which can be arranged to stand alone upon a given support, without relation to a tire casing or the like, and which by simple adjustments can be altered to assume a wide range of angular positions with respect to as well as that of vertical.

Still another object is to provide a further modified form of the device, comprising a differently constructed sectional easel, which is particularly well adapted for use in supporting a paper or similar sheet between its oppositely positioned, transversely extending, rigid elements, or for operatively extending and supporting a moving picture screen, which is frequently mounted upon a suitable roller within a suitable box or other container.

With the objects thus broadly stated, the said invention comprises further details of construction and operation, which are hereinafter fully brought out in the following description, when read in conjunction with the accompanying drawings, in which Fig. 1 is an elevational view of any representative make of pneumatic tire casing in combination with a device, comprising one embodiment of the invention;

Fig. 11 is a side elevational view of a modified form of the easel, also with the flexible medium shown by a dot-and-dash line;

Fig. 12 is a fragmentary rear elevational view of the central portion of the easel and medium;

Fig. 13 is an enlarged fragmentary elevation of the pivotal connection between the two sections of the easel in Fig. 11;

Fig. 14 is a vertical section on the line 14—14 of Fig. 13;

Fig. 15 is a side elevational view of the easel of Fig. 11, shown in combination with a box, which is in turn, shown in section and comprises hingedly connected sections, one of which contains a rolled flexible medium; and Fig. 16 is a side elevation of a simplified modified form of the easel of Fig. 11.

Figure 1:
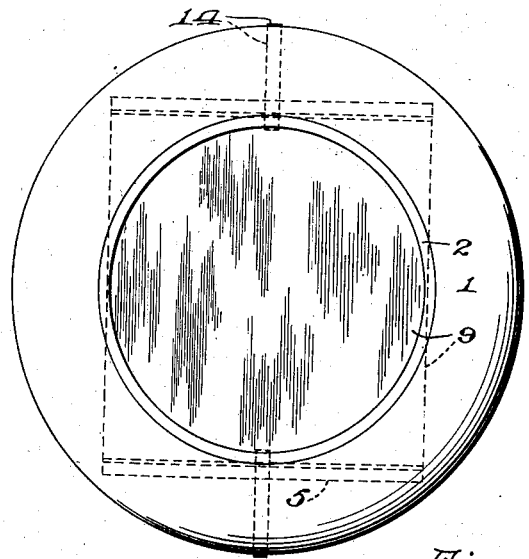
Figure 2:
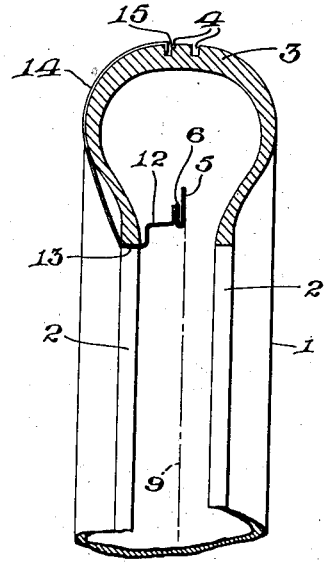
Fig. 2 is an enlarged radial sectional view of the upper substantially half part of the combination shown in Fig. 1.
Figure 4:
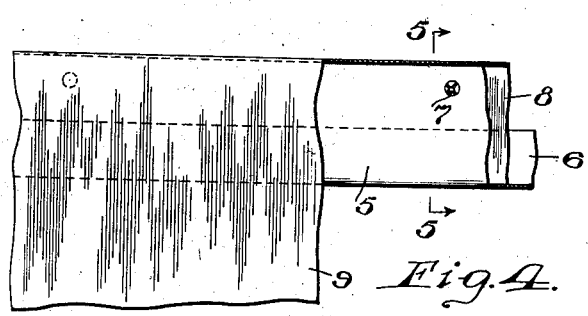
Fig. 4 is an enlarged fragmentary elevational view of the flexible medium and one of its supporting members.

Referring to Figs. 1 to 5 inclusive, a tire casing 1 is shown as comprising spaced flanges 2, connected by means of the usual tread 3, which is provided as usual with any one of many well-known forms of anti-skidding tread irregularities including recesses 4. Extending within both the upper and lower portions of the casing when in upright position are spaced, and this instance parallel, transversely U-shaped, longitudinally rigid members, each of which comprises in cross section spaced flanges 5 and 6, the former of which is much greater in extent than the latter, and is preferably provided with suitable spurs 7, or other suitable type of securing means for attaching thereto the opposite end portions 8 of the flexible medium 9, said end portions normally entering the space between and being shielded by said flanges, as shown in Fig. 4. The narrower flange 6 is provided with one or more straps 10 upon its outer surface, into each of which is removably inserted one free end portion 11 of the flexible and resilient bracket best shown in Fig. 3. Said bracket end 11 is carried by a short substantially horizontally extending section 12, beyond which is a depressed offset 13, adapted to encircle one of the casing flanges 2, beyond which the said bracket is rounded outwardly, upwardly and thence reversely to comprise a casing encircling portion 14, terminating in a radially inwardly directed portion 15, which normally enters and engages the side walls of one or more of the recesses 4 in the casing tread, as indicated in Fig. 2. From the construction of this form of the invention, it will be readily seen that the opposite marginal portions of the flexible medium, upon which if desired any desired indicia may be printed, painted, or otherwise placed, are passed over the oppositely directed edges of the wider flanges 5, until they extend between said flanges 5 and 6, so that they are engaged by the spurs or other form of attaching means 7. By rolling and then unrolling, or by other suitable form of manipulation, the said flanged members are inserted within the casing in spaced relation, as shown in Fig. 1, and the brackets secured to said members and to said casing as indicated in Figs. 1 and 2, the length of the said flexible medium and the form and resiliency of the said brackets being such that said medium is positioned and maintained taut, completely spanning the inner open space surrounded by the casing, or to such less extent as may be desired.

Figure 5:
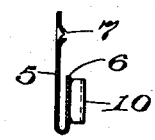
Fig. 5 is a section of the said member per se on the line 5—5 of Fig. 4.
Figure 3:
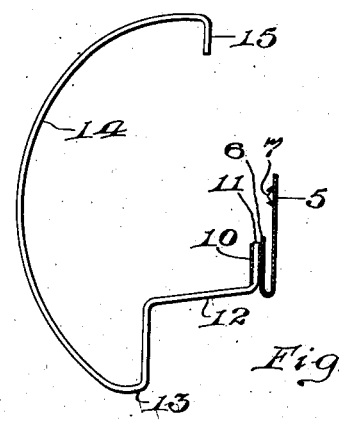
Fig. 3 is an enlarged side elevational view of one of the two brackets shown in Fig. 1, and also shown individually in Fig. 2.
Figure 6:
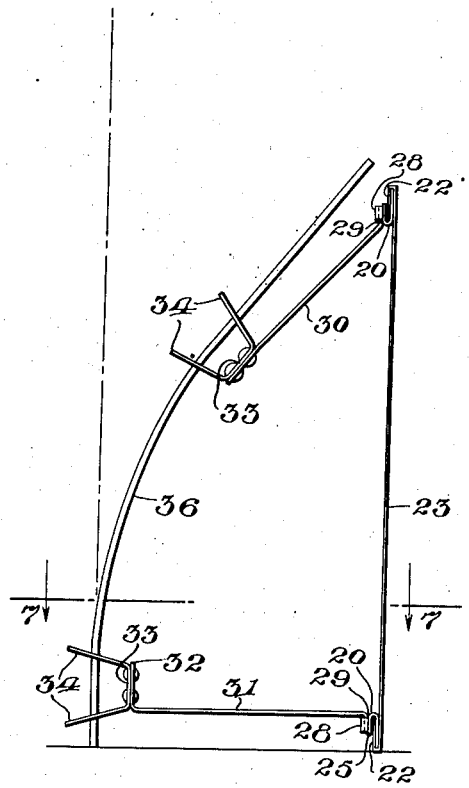
Fig. 6 is a side elevational view of a modified form of easel and a flexible medium supported thereby.
Figure 7:
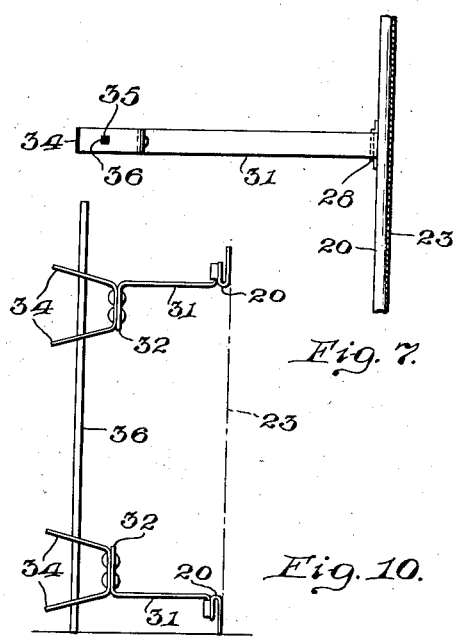
Fig. 7 is a horizontal section on the line 7—7 of Fig. 6.

Referring to Figs. 6 to 9 inclusive, there is here illustrated a pair of spaced preferably parallel and transversely extending supporting members 20, of U-shaped cross section and substantially similar to the member hereinbefore described, and as illustrated in Fig. 5. The longer flange 21 of each of these members has bent around it the adjacent marginal portion 22 of a flexible element 23, which may be plain or may bear any desired form of indicia, said marginal portions 22 being secured as before by means of spurs 24 or the like, while if desired the shorter flange 25 of each of said members may be provided with any desired number of resilient retaining fingers 26, pivotally secured at 27 to the supporting flange, and having their free end portions so arranged as to cooperate with the spurs 24 when in operative position, to prevent the accidental disengagement from said spurs of the marginal portions of said flexible element. Detachably positioned within the straps 28 of the members 20 are the angularly extending terminal portions 29 of laterally or rearwardly extending brackets 30 and 31. As shown in Fig. 6, these brackets, except for the said terminal portions 29, may be rectilinear as in the first instance, or may be angularly bent as in the second instance, to form an angularly disposed rear terminal portion 32. In either case the rearmost free end portion of each of said brackets has secured to it by any suitable means the central portion 33 of a substantially U-shaped or V-shaped clamp, comprising spaced arms 34 thru which extend substantially aligned apertures 35, thru which apertures in turn is adapted to slidably extend a transversely flexible resilient rod 36.

In any case, the normally divergent relation between the arms of each of said clamps maintains said clamps in binding frictional engagement with a given portion of said rod, while any one or more of said clamps may be shifted upon said rod by pinching or pressing together the arms of such clamps, and then sliding the same longitudinally upon said rod, until the desired position is reached, when said clamp arms upon being released will re-engage said rod so as to maintain the relative predetermined positions of said brackets, and thereby place upon and maintain the desired degree of tension upon said flexible element 23.

Figure 10:
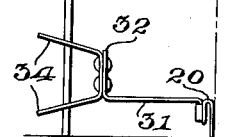
Fig. 10 is a side elevational view of a slightly different arrangement of the easel of Fig. 6, showing the flexible medium by a dot-and-dash line.
Figure 8:
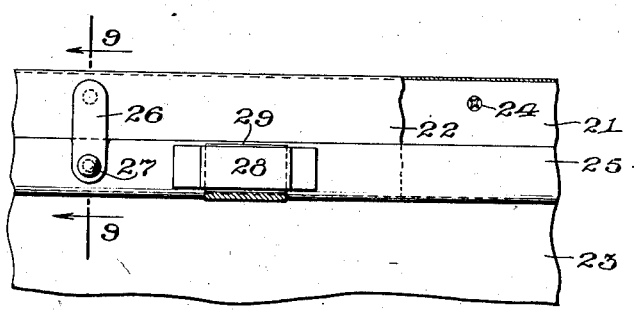
Fig. 8 is an enlarged fragmentary elevational view of the flexible medium, a supporting member and a portion of the resilient stretching means, shown in Fig. 6.
Figure 9:
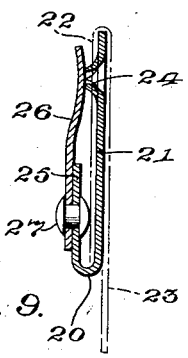
Fig. 9 is an enlarged sectional view on the line 9—9 of Fig. 8.

Instead of the brackets 30 and 31 being differently shaped, as shown in Fig. 6 they may be of the same shape, as shown in Fig. 10, wherein the same numerals are applied to said clamps as are applied to the lower clamp in Fig. 6. In either case, if desired, the lower end of the rod 36 may be substantially in the same horizontal plane with that of the lower supporting member 20, in which case the easel and flexible elements supported thereby will stand upon any given surface which occupies or approaches the horizontal, as indicated in both of Figs. 6 and 10.

Referring to Figs. 11 to 14 inclusive, there is here shown a flexible element 40, having its opposite marginal portions as hereinbefore described, carried by supporting members 41, which are in turn detachably secured to the divergently extending resilient arms 42 and 43 of a sectional easel or bracket, said arms or sections being pivotally connected by any suitable means at 44, and adapted when not in use to swing reversely upon each other, as shown by the respective dot-and-dash positions 42$^a$ and 43$^a$. The lowermost end portion of the arm 42 may if desired be laterally directed at 45 to rest upon a supporting surface in the same plane with the lower edge of the lower element supporting member 41, as indicated in Fig. 11.

In Fig. 16 a slightly more simple form of easel is shown, but one which is not as readily collapsible for shipping purposes as that last before described. In this case, however, the divergent resiliently positioned arms 50 and 51 will connect thru a resilient angular portion 52, which if desired may rest upon the same support with the lowermost of a plurality of members 53, which are adapted to support the opposite marginal portions of a flexible element, indicated by the dot-and-dash line 54, which element is secured to said member also as hereinbefore described.

Referring finally to Fig. 15, the improved easel is shown as being adapted to a flexible extension screen or the like, and the casing or box containing the same, such for instance as the screens used in amateur moving picture projections. In this instance a box or case is shown as comprising a normally lower section 60, which when closed forms an upper cover 61, pivotally connected at 62, said cover section being adapted to oscillate into a position beside and in the same plane with said bottom section 60, in which last-named section is rotatably mounted upon any suitable form of "shade-roller-support" 63, a flexible screen element 64, the free end portion of which is adapted to be attached to a transversely extending member 65 of the type hereinbefore described, and comprising one or more straps 66, in which extends the free angularly directed end portion 67 of a flexible arm 68, which at its lower end is pivotally connected at 69 to a second arm 70, which in turn is provided with an angularly directed terminal portion 71, extending thru a strap 72 upon the inner surface of one of the walls of the cover section 61 of the box. When this bracket and flexible screen are positioned as shown in Fig. 15, the extended portion of said screen 64 is adapted to receive the projection of moving picture or other optical projections or reproductions, and when not in use said screen is intended to be automatically retracted upon and around the "shade roller support", and the bracket detached and reversely folded as indicated by the dot-and-dash positions 42ª and 43ª of Fig. 11, and placed within the cover section of the box as in the dot-and-dash position 73 beneath the retaining member 74, or otherwise as may be desired.

I am aware that the invention may be embodied in other specific forms without departing from the spirit or essential attributes thereof, and I therefore desire the present embodiment to be considered in all respects as illustrative and not restrictive, reference being had to the accompanying claims rather than to the foregoing description to indicate the scope of the invention.

Having thus described my invention, what I claim and desire to protect by Letters Patent of the United States is:—

1. The combination of a tire casing, with a transversely extending member within said casing, a card or sheet attached to said member and extending across the space surrounded by and parallel with the plane of said casing, and means engaging said member and yieldingly engaging the tread of said casing, to maintain said card or sheet in operative position.

2. The combination of a tire casing, with a member within and extending in the plane of said casing, a card or sheet detachably supported by said member, across the space surrounded by said casing, and a resilient means having one end engaging said member, its opposite end engaging the tread of the casing, and its intermediate portion encircling a side wall of said casing, to yieldingly maintain said card or sheet in operative position.

3. The combination of a tire casing, with a pair of spaced members extending across, within and in the plane of said casing, a card or sheet detachably supported by and between said members across the space surrounded by said casing, and a pair of resilient means, one end of each of which is detachably connected to one of said members, the opposite end of each of which engages the tread of the casing, while their intermediate portions encircle a side wall of said casing, to yieldingly tension and maintain said card or sheet in operative position.

HENRY HARRISON.